Sept. 2, 1969   R. BECKER   3,464,679
RECTIFICATION-COLUMN ASSEMBLY
Filed Jan. 24, 1966
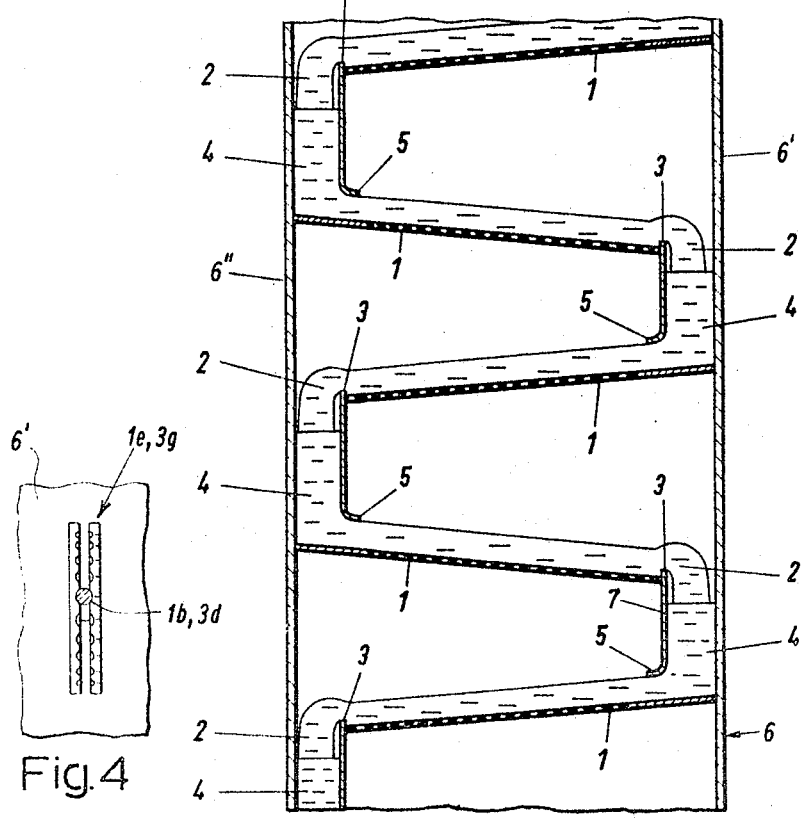
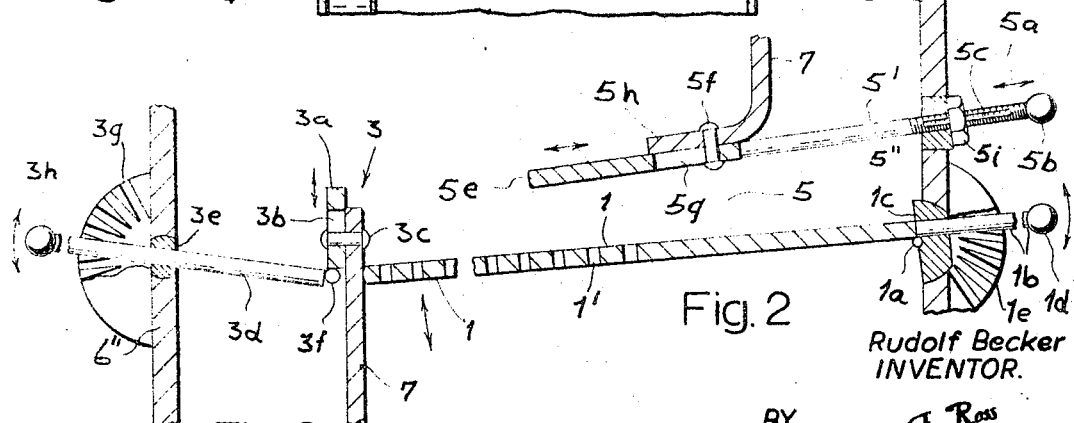
Rudolf Becker
INVENTOR.
BY Karl G. Ross
Attorney 0
United States Patent Office
3,464,679
Patented Sept. 2, 1969

3,464,679
RECTIFICATION-COLUMN ASSEMBLY
Rudolf Becker, Munich-Solln, Germany, assignor to Linde Aktiengesellschaft, Wiesbaden, Germany, a corporation of Germany
Filed Jan. 24, 1966, Ser. No. 522,570
Claims priority, application Germany, Jan. 22, 1965, G 42,643
Int. Cl. B01d 3/24
U.S. Cl. 261—114        4 Claims

ABSTRACT OF THE DISCLOSURE

A rectification column for intimately contacting an ascending vapor phase with a descending liquid phase, including a tower which houses a stack of spaced-apart perforated rectification plates inclined downwardly in alternately opposite directions and respective nozzles along the major part (at least) of the width of each plate for delivering the liquid phase thereto with a flow velocity of at least 1 m./sec., the inclination of the plates and the cross-section of the nozzles being adjustable from the exterior of the column, each plate having an upstanding weir partly damming the flow along the respective plates to maintain a predetermined liquid-layer thickness thereon.

My present invention relates to rectification-column assemblies and, more particularly, to an improved multi-stage rectification tower of the type in which a gas or vapor is passed countercurrent to a stream of liquid and into intimate contact therewith through a plurality of perforated rectification-column stages or plates.

In many apparatus structures for the intimate contact of a stream of vapor and a liquid, upright columns are provided with a multiplicity of spaced-apart stages or plates through the perforations of which the gas is passed into contact with a liquid conveyed generally downwardly along these plates and constituting a substantially continuous phase. Such columns are in common use in rectification of air into its components (e.g., nitrogen and oxygen), the air being passed countercurrent to a liquid phase of oxygen or nitrogen descending the column over a multiplicity of perforated plates while the gas flows upwardly through the perforations in these plates into intimate contact with the liquid phase and is thereby cooled to precipitate the component corresponding to the liquid phase. Processes of this type include the Linde gas-rectification system wherein liquid nitrogen or liquid oxygen descends through the column while air passes upwardly therealong. Other cryogenic systems use similar columns and, when reference is made herein to rectification towers or columns having a plurality or stack of spaced-apart perforated plates, it will be understood that such references are intended to include all columns of this general type for the purpose of gas rectification into its components. Conventional columns of this type are essentially provided with a stack of horizontal but vertically spaced plates with the continuous phase of liquid substantially filling the column as it passes from upper plates onto lower plates while descending the column in countercurrent to the ascending gas stream. In the theory of such columns, an intimate contact of the gas with the liquid depends upon the height of the liquid layer on these plates and thus the thickness of the layer through which the gas must pass, the quantity of gas which can be fed through the layer and the volume of liquid to which the gas is exposed. In practice, however, the rate has been limited by the geometrical configuration of the column to a velocity of substantially 0.05 to 0.5 m./second and, because of these relatively slow speeds, the heights of the liquid layers upon the plates had to be relatively large to guarantee the necessary liquid volume. A corollary disadvantage derives from the fact that high pressure must be applied to the vapor to drive it through the perforations and the thickness of liquid on the plates, and from the correspondingly large pressure drop resulting from the thickness of the layer. As the cross-sections of the columns are increased, their geometry requires that the thickness of the liquid layer be increased correspondingly so that the larger rectification columns result in still larger pressure drops across each rectification stage.

It is the principal object of the present invention to provide a rectification-column assembly which enhances the efficiency of operation of large-size columns, is characterized by a larger throughput of both the liquid and vapor phases and affords improved contact between the liquid and gas phases.

A further object of this invention is to provide a rectification-column assembly in which the height or thickness of the continuous liquid phase can be substantially reduced by comparison with earlier systems without, however, materially affecting the efficiency of the rectification process.

Still another object of the invention is to provide a rectification assembly which can be controlled to vary the operating characteristics of the device even during a rectification process.

These objects and others which will become apparent hereinafter are attained, in accordance with the present invention, in a rectification assembly comprising a column or tower having a plurality of vertically spaced perforated plates, constituting respective rectification stages, along which the continuous liquid phase is passed generally downwardly while the vapor phase is passed upwardly through the perforations in these plates, wherein each of the plates or stages is provided at the liquid-entrance side with a constricted inlet opening narrowing with respect to the flow cross-section of the previous stage or the liquid column interconnecting the successive stages so that the velocity of liquid flow at the inlet to each plate is increased to at least 1 m./second. It has been found that the invention, as thus characterized, affords substantial advantages by comparison with earlier systems. For example, the increased velocity of the liquid flow at the inlets to the respective plates, each of which is provided with a nozzle-like constriction at its inlet, permits a substantial reduction of the thickness of the liquid layer on these plates without materially affecting the volume of liquid exposed to the gas throughput traversing the liquid layer via the plate apertures. The reduced liquid height permits a higher velocity of gas throughput at each stage as well as an overall volume-rate of flow of the vapor which is considerably in excess of that possible heretofore for a column of the same overall dimensions and with a corresponding number of stages but constructed in accordance with prior-art techniques; furthermore, the pressure drop of the vapor passing through the stages is sharply reduced by comparison with prior systems, especially in rectification columns or towers with large cross-sections. The larger vapor velocity obtainable in this manner also permits a proportionately smaller rectification plate (i.e., reduced area) to be employed. I have found, moreover, that the high flow velocity of the liquid phase also acts to deflect the vapor passing therethrough and thereby improves the rectification efficiency as well as the efficiency with which gas-entrained droplets of liquid are precipitated from the vapor phase. Because of the higher vapor-phase velocity, the vertical spacing between the individual stages or plates can be reduced with an accompanying reduction in the height of the liquid column feeding each plate in accordance with the reduced thickness or height of the liquid layer thereon. In this manner, the backlog of liquid in the feeding columns of each plate can be significantly reduced. Furthermore, the high liquid velocity permits the perforations of the plates to be of larger diameter or cross-section, a factor which contributes additionally to the reduction of the pressure losses across each stage.

According to a further feature of this invention, the inlet openings of each plate are formed respectively as nozzles whose cross-sections are only a fraction of the cross-section of the respective liquid-supply column connecting the adjacent stages. The nozzles according to this invention can be adjustable, preferably from the exterior of the rectification tower, to permit optimizing and adjusting the liquid-flow velocity to obtain a maximum rectification efficiency for the particular liquid employed. When control of the nozzle aperture is permitted from the exterior of the tower, it is possible to regulate the flow velocity and rectification efficiency during a rectification process. Additionally, I provide means for adjusting the inclinations of the perforated plates to obtain a satisfactory flow velocity and to maintain the flow velocity over all of the plates of the rectification assembly substantially constant, thereby maintaining a substantially constant level of the liquid layer. Advantageously, the successively lower plates of the rectification assembly are inclined downwardly in opposite directions and have their nozzle-like inlet and feed columns alternately on opposite sides of the tower.

A further feature of this invention resides in the provision of an adjustable weir at the outlet side of each plate and between the plate and the adjacent feed column for the successively lower plate to provide further control of the fluid velocity and the level of the liquid layer on the respective plate. Such a weir can be adjustable from the exterior of the tower, again affording the possibility of regulating the flow velocity, layer height and rectification efficiency during a rectification operation.

These and other objects, features and advantages of the present invention will become more readily apparent from the following description, reference being made to the accompanying drawing in which:

FIG. 1 is a vertical cross-sectional view through a portion of a rectification tower showing the perforated-plate assembly thereof;

FIG. 2 is an enlarged detail view of the assembly illustrating the adjusting means for the inlet nozzle and the inclination of the perforate-plate of each rectification stage;

FIG. 3 is a view similar to FIG. 2 showing the mechanism for adjusting the height of the weir of each stage; and FIG. 4 is an elevational view of an adjusting system.

In FIG. 1, I show a rectification tower 6 which can be used in any of the cryogenic processes mentioned above and which is provided in the usual manner with an inlet for a rectifiable gas or vapor at its lower end, means at this lower end for withdrawing the liquid from the tower and further means, possibly an additional length of tower as is sometimes the case, for passing a stream of liquid in a continuous flow downwardly along the rectification plates. The return flow of liquid 2 forms a layer of a continuous liquid phase along a succession of vertically spaced perforated plates 1 inclined to the horizontal alternately in opposite directions and constituting the respective rectification stages, the plates 1 extending inclinedly between opposite portions 6', 6" of the tower wall and terminating at their lower ends short of that wall. At the outlet side of each of the perforated plates 1, I provide a weir 3 which extends into the path of the liquid layer cascading over the outlet end of the plate and forming a low dam therefor. As the liquid layer passes over each weir, it enters into a feed column 4 of liquid whose head is sufficient to drive the liquid through a nozzle-like constriction 5 at the inlet of a successively lower plate 1 with a velocity of at least 1 meter/second, as previously mentioned, this velocity constituting a critical lower limit. From the nozzle-like inlet opening 5, the liquid stream flows in a layer along the downwardly inclined perforated plate 1 until it passes over a further weir into the feed column of the next-lower rectification stage. Because of the relatively high velocity of the layer of liquid flowing over each of the plates 1, the height of this layer is proportionately small while the downward inclination of each plate in the direction of fluid flow maintains the height of the liquid layer constant over all of the rectification plates. Under these conditions, the vapor bubbling or percolating through the liquid layers from the apertures of the respective plates is exposed at all times to the same conditions (e.g., pressure drop, liquid-layer height). The rectification tower can be of the atmospheric-pressure or superatomspheric-pressure type and the means for passing the return stream of liquid downwardly along the perforated plates can include spray heads or the like for previously condensed vapor fractions.

While the adjusting means for the various portions of the assembly have not been shown in FIG. 1 in order to provide an overall picture of the assembly, it can be seen from FIG. 2 that an important aspect of the present invention resides in the adjustability of the cross-section of the inlet opening 5 to each plate 1. Adjustability can be ensured by substantially any mechanism designed to permit variation of the nozzle cross-section from the exterior of the tower and one such mechanism is shown in FIG. 2 wherein a rod 5' extends through a wall portion 6' of the tower 6 and is slidable in a guide bushing 5" which frictionally resists linear displacement in the direction of arrow 5a. The handle portion 5b may be manually engaged externally of the tower 6 although it may also be desirable to provide a servo-mechanism or other automatic control means for the rod 5' illustrated in FIG. 2 and the corresponding rods of each of the nozzles 5. The rod 5' is calibrated at 5c to show the position of an adjustable nozzle wall 5e and thus the effective cross-section of the nozzle opening. The movable wall 5e is slidably guided via a pin 5f and its slot 5g along the inwardly turned flange 5h of a wall or portion 7 forming the feed channels 4 of the liquid phase, wall 5e constitutes an extension of flange h projecting toward the weir 3a and the opposite wall portion 6" of tower 6, approaching the lower plate 1 with a degree of convergence determined by the slope of the latter. As the rod 5' is thrust further into the tower 6, the associated flange extension 5e is moved inwardly and downwardly toward the respective perforated plate 1 to extend the effective length of flange 5h so as to reduce the flow cross-section of the nozzle or inlet 5 and thus increase the velocity of flow of the liquid across the plate 1. Since the nozzles 5 can be individually or collectively adjusted in this manner, the positions of the various actuating members 5' and the nozzle openings can be set to obtain maximum rectification efficiency. A nut 5i, threaded onto the rod 5' and adapted to rest against the wall 6', permits setting of the adjustment to the desired value.

As also seen in FIG. 2, each of the plates 1, whose perforations 1' may be of a larger cross-section than the perforations of earlier rectification-tower stages using slower liquid-flow velocities, is so mounted in the tower as to permit adjustment of the inclination of the plate in accordance with any desired modification or fluctuation of the liquid-flow velocity in order, for example, to maintain it constant under different columns, vary it in accordance with the desired flow rate of a particular liquid phase or compensate for specific characteristics of a particular rectification process. The means for variably mounting the plate can be of such nature that the inclination of the plates can be modified only from within the tower or can include actuating means externally thereof, as illustrated in FIG. 2. The mounting means here include a hinge 1a for each plate 1 at the inlet side of the respective stage, i.e., the elevated portion of the plate underneath feed channel 4, and a lever 1b extending through a rotatable bearing 1c in the wall portion 6' of the tower 6, this bearing being centered upon the pivotal axis of hinge 1a so that movement of the lever 1b, whose handle 1d renders it manually actuatable or which can be provided with a servomotor for joint operation with the other plates, permits the angle of inclination of the plate to be adjusted along with the effective width of nozzle 5. An indicator dial 1e can be provided to show the degree of angular tilt for each plate while locking means can be used to prevent swinging of the plate under the weight of the liquid layer, as described hereinafter with reference to FIG. 4. It will be understood that the gas passes upwardly through the perforations 1' and the liquid layer thereabove and thence through successively higher stages of the rectification tower.

In FIG. 3, I show the adjusting means for each of the weirs 3 of the respective stages constituted by upstanding formations of partitions 7. Each weir 3 comprises an extension plate 3a vertically shiftable upon the partition 7 of the feed channel 4 for the successively lower stage and thus at the outlet side of the respective stage, i.e., along the lower edge of the next higher plate 1, the guide means for the weir plate 3a being shown as a slot 3b therein and a pin 3c passing slidably through the slot. An adjusting rod 3d projects through the wall portion 6" of the tower and is fulcrumed in a rotatable bearing 3e therein. The rod 3d is hinged at 3f to the weir gate 3a and co-operates with an indicator 3g calibrated directly in terms of the height of this gate. The handle portions 3h of the actuating rods 3d can be manually operated individually or coupled together for joint operation. Servomeans can be provided here as well for individual or joint operation for the weir-height adjustment. As shown in FIG. 4, the disks 1e and 3g are slotted in their planes to receive the respective rods and provided with radial grooves into which the rods can be forced by resilient camming of the plates outwardly to index the rods at any desired position.

Handles 1d, 5b and 3h, respectively, constitute a first, a second and a third control means for adjustment of the structure illustrated in FIG. 1.

EXAMPLE

A conventional Linde double column for air separation, whose lower column was operated at about 4–5 atmospheres and whose upper column was at atmospheric pressure, was employed for the recovery of liquid oxygen or nitrogen and had a liquid capacity of 2800 m.³/hr., a flow path of 2500 mm. per stage, a weir height at each stage of 5 mm. and a maximum liquid-flow velocity at the outlet cross-section of each feed column of 0.5 m./sec. The liquid layer upon the plates had a height of about 320 mm. while the feed columns of each stage had heights of 965 mm. When a constricted nozzle was provided at the outlet side in accordance with the present invention, the same liquid-flow capacity and flow length per stage was maintained with a weir height of 5 mm. except that the flow velocity at the outlet or nozzle was 1.5 m./sec., the height of the liquid layer upon each plate was reduced to 215 mm. and the heights of the feed heads or columns were reduced to 595 mm. The vapor-phase capacity was increased in inverse relationship to the decrease in height of the liquid layer.

I claim:

1. A rectification column comprising a tower with a wall; a plurality of stacked, vertically spaced perforated plates in said tower alternately extending in opposite directions with a downward slope and terminating short of said wall to form outlets for liquid flowing along said plates; upright partitions within said tower closely spaced from said wall and extending each from a lower edge of a higher plate to a location above the next-lower plate to form channels with said wall for the transfer of liquid from such higher plate to such next-lower plate, each of said channels overlying an elevated inlet portion of the corresponding lower plate, each of said partitions having an upstanding formation rising beyond said lower edge of the corresponding higher plate to form a weir for liquid flowing down on said higher plate; pivot means at said elevated inlet portion swingably connecting the respective plate to the wall for limited rotation about a horizontal axis adjacent said wall; first control means extending outwardly from said inlet portion through said wall for swinging the respective plate about said axis to vary its inclination; extensions on the lower ends of said partitions each projecting toward said upstanding formation while approaching the corresponding lower plate and defining therewith a nozzle converging to an extent determined by said inclination; and second control means extending outwardly from each of said extension through said wall for varying the effective length of said nozzle.

2. A rectification column as defined in claim 1 wherein said first control means comprises a swingable handle and indexing means for retaining said handle in different angular positions.

3. A rectification column as defined in claim 1 wherein said upstanding formation comprises an extension plate disposed alongside the corresponding partition with freedom of limited relative vertical displacement, further comprising third control means extending outwardly through said wall for displacing said extension plate to vary the effective height of the weir.

4. A rectification column as defined in claim 3 wherein said third control means comprises a rod pivoted in said wall, hinge means connecting said rod with said extension plate, and indexing means for retaining said rod in different angular positions.

References Cited

UNITED STATES PATENTS

| | | | |
|---|---|---|---|
| 1,320,396 | 11/1919 | Laird. | |
| 2,290,055 | 7/1942 | Kinsey | 261—114 X |
| 2,539,142 | 1/1951 | Kelley et al. | 261—114 |
| 2,786,082 | 3/1957 | Klockman. | |
| 3,103,545 | 9/1963 | Korelitz | 261—114 |
| 2,055,301 | 9/1936 | McConnell | 261—114 |
| 2,702,434 | 2/1955 | Richardson et al. | |
| 2,787,453 | 4/1957 | Hibshman et al. | 261—114 |
| 2,966,262 | 12/1960 | Hobart | 209—157 XR |
| 3,000,502 | 9/1961 | Hobart | 209—458 |
| 3,282,576 | 11/1966 | Bruckert et al. | 261—114 |

FOREIGN PATENTS

| | | |
|---|---|---|
| 823,108 | 11/1959 | Great Britain. |
| 655,087 | 1/1938 | Germany. |

RONALD R. WEAVER, Primary Examiner

U.S. Cl. X.R.

202—158